(12) United States Patent
Mawston et al.

(10) Patent No.: US 10,160,414 B2
(45) Date of Patent: Dec. 25, 2018

(54) BUMPER ASSEMBLY METHOD AND APPARATUS

(71) Applicant: JAGUAR LAND ROVER LIMITED, Whitley, Coventry, Warwickshire (GB)

(72) Inventors: Craig Mawston, Leamington Spa (GB); Phil Harrison, Solihull (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/304,522

(22) PCT Filed: Apr. 15, 2015

(86) PCT No.: PCT/EP2015/058196
§ 371 (c)(1),
(2) Date: Oct. 15, 2016

(87) PCT Pub. No.: WO2015/158786
PCT Pub. Date: Oct. 22, 2015

(65) Prior Publication Data
US 2017/0036627 A1    Feb. 9, 2017

(30) Foreign Application Priority Data

Apr. 16, 2014   (GB) ................................. 1406879.5

(51) Int. Cl.
*B60R 19/24*    (2006.01)
*B60Q 1/26*     (2006.01)
(Continued)

(52) U.S. Cl.
CPC ............ *B60R 19/24* (2013.01); *B60Q 1/2619* (2013.01); *B60Q 1/2638* (2013.01);
(Continued)

(58) Field of Classification Search
CPC . B60R 2019/1886; B60R 19/18; B60R 19/24; B62D 25/084; B60Q 1/045;
(Continued)

(56) References Cited

U.S. PATENT DOCUMENTS 4,251,103 A * 2/1981 Nakajima ............ B62D 25/087
                                                   293/102
4,721,333 A *  1/1988 Morio ...................... B60J 5/101
                                                   293/146
(Continued)

FOREIGN PATENT DOCUMENTS

DE          10228464 A1     1/2004
DE          10237454 B3     2/2004
(Continued)

OTHER PUBLICATIONS

Combined Search and Examination Report for application No. GB1406879.5, dated Nov. 12, 2014, 6 pages.
(Continued)

*Primary Examiner* — Kiran B Patel
(74) *Attorney, Agent, or Firm* — Reising Ethington P.C.

(57) ABSTRACT

A method of mounting a bumper to the body structure of a motor vehicle using a locating member having an lamp-engagement portion for engaging a lamp, and a fixing portion. The fixing portion is movably coupled to the lamp-engagement portion. The method includes attaching the fixing portion to the body structure so that the locating member is movable relative to the body structure. The locating member is positioned such that the lamp engagement portion engages the lamp and the locating member is fixedly mounted to the body structure. The bumper is located in an aligned position in relation to the lamp using an alignment portion of the locating member. The bumper is then fixed in the aligned positioned.

10 Claims, 10 Drawing Sheets

(51) Int. Cl.
*B60Q 1/30* (2006.01)
*B62D 65/16* (2006.01)
*B60R 19/50* (2006.01)

(52) U.S. Cl.
CPC ............ *B60Q 1/2642* (2013.01); *B60Q 1/30* (2013.01); *B62D 65/16* (2013.01); *B60R 2019/505* (2013.01)

(58) Field of Classification Search
CPC .......... B01D 2265/026; B01D 2273/30; B01D 46/0043; B01D 46/0086; B01D 46/103
USPC ................................. 296/117, 120, 121, 155
See application file for complete search history.

(56) References Cited

U.S. PATENT DOCUMENTS

| | | | | |
|---|---|---|---|---|
| 5,066,057 A * | 11/1991 | Furuta | ...................... | B60R 19/18 293/121 |
| 5,580,109 A * | 12/1996 | Birka | ...................... | B60R 19/18 293/120 |
| 5,957,512 A * | 9/1999 | Inada | ...................... | B60R 19/24 293/102 |
| 6,523,886 B2 * | 2/2003 | Hoffner | ................ | B60Q 1/0433 296/203.02 |
| 7,014,257 B2 * | 3/2006 | Lazzeroni | ........... | B25B 27/0035 296/193.09 |
| 7,097,239 B2 * | 8/2006 | Lazzeroni | ........... | B60Q 1/0408 296/193.09 |
| 8,911,005 B2 * | 12/2014 | Townson | ............. | B62D 25/085 29/466 |
| 2004/0264203 A1 * | 12/2004 | Konno | ................. | B60Q 1/0433 362/465 |
| 2005/0017520 A1 * | 1/2005 | Evans | ...................... | B60R 19/18 293/120 |
| 2005/0088015 A1 * | 4/2005 | Kishikawa | ........... | B60Q 1/0425 296/193.09 |
| 2006/0125253 A1 * | 6/2006 | Trabant | ................... | B60R 19/24 293/155 |
| 2006/0255602 A1 * | 11/2006 | Evans | ..................... | B60R 19/18 293/120 |
| 2008/0157566 A1 * | 7/2008 | Tazaki | ................... | B60R 19/52 296/193.1 |
| 2010/0080013 A1 * | 4/2010 | Riviere | ................ | B62D 25/084 362/523 |
| 2013/0022679 A1 | 1/2013 | Huber et al. | | |
| 2013/0026791 A1 * | 1/2013 | Huber | .................... | B60R 19/24 296/193.09 |
| 2016/0090127 A1 * | 3/2016 | Park | ..................... | B60Q 1/0408 296/193.09 |
| 2016/0221490 A1 * | 8/2016 | Kandlbinder | ........ | B60Q 1/0475 |

FOREIGN PATENT DOCUMENTS

DE 102011017157 A1 12/2011
WO WO2012066723 A1 5/2012

OTHER PUBLICATIONS

International Search Report for International application No. PCT/EP2015/058196, dated Aug. 5, 2015, 4 pages.
Written Opinion for International application No. PCT/EP2015/058196, dated Aug. 5, 2015, 5 pages.
Combined Search and Examination Report for application No. GB1406879.5, dated Nov. 12, 2014, 6 pages (see e.g. report conclusions on p. 6).
International Search Report for International application No. PCT/EP2015/058196, dated Aug. 5, 2015, 4 pages (see e.g. characterization of references on p. 3).
Written Opinion for International application No. PCT/EP2015/058196, dated Aug. 5, 2015, 5 pages (see e.g., report conclusions on p. 4-5).

* cited by examiner

BUMPER ASSEMBLY METHOD AND APPARATUS

TECHNICAL FIELD

The present disclosure relates to a method of assembling a bumper to the body structure of a motor vehicle, to apparatus for use in such a method, to a vehicle body structure including at least one such assembled bumper/body assembly, and to a motor vehicle including such a vehicle body structure.

BACKGROUND

During assembling of a vehicle, it is desirable to align components to form a uniform gap, particularly between exterior body panels and components. Achieving acceptable fit and finish often depends on the skill and judgment of the operator on the assembly line. The difficulty in aligning components can be compounded by the limited time available on the assembly line to perform the fitting operation. A particular problem has been identified by the applicant when fitting tail lamps and the rear bumper since these components are arranged in a stacked configuration. The tail lamp is aligned in relation to a body panel and the bumper must then be aligned in relation to the tail lamp.

At least in certain embodiments, the present invention seeks to provide a method and apparatus that facilitates mounting of the bumper and tail lamps.

SUMMARY OF THE INVENTION

Aspects of the present invention relate to a method of assembling a bumper to the body structure of a motor vehicle, to apparatus for use in such a method, to a vehicle body structure including at least one such assembled bumper/body assembly, and to a motor vehicle including such a vehicle body structure.

According to a further aspect of the present invention there is provided a method of mounting a bumper to the body structure of a motor vehicle using a locating member, the locating member having at least one lamp engagement portion, bumper alignment means and at least one fixing portion, the at least one fixing portion being movably coupled to the at least one lamp engagement portion; wherein the method comprises:

mounting the at least one fixing portion to the body structure, positioning a lamp relative to the body structure, positioning the locating member such that the at least one lamp engagement portion engages the lamp and then fixedly mounting the locating member to the body structure, positioning the bumper in an aligned position in relation to the lamp by means of the bumper alignment means, and fixedly mounting the bumper in said aligned position. The at least one fixing portion can be fixedly mounted to the body structure whilst allowing the lamp engagement portion to move relative to the body structure. This allows the locating member to be provisionally mounted to the body structure before finalizing its position in relation to the lamp. The locating member can then be fixedly mounted to the body structure thereby fixing the position and/or orientation of said bumper alignment means. The bumper can then be positioned in said aligned position with respect to the lamp using the bumper alignment means. When the bumper is in said aligned position, a substantially uniform panel gap can be formed between complementary surfaces of the bumper and the lamp.

The locating member can comprise a first lamp engagement portion for engaging a first lamp and a second lamp engagement portion for engaging a second lamp. The method can include positioning the locating member such that the first and second lamp engagement portions engage said first and second lamps respectively. When the first and second lamp engagement portions engage said first and second lamps, the locating member can be fixedly mounted to the body structure.

A coupling can be provided for movably coupling the least one lamp engagement portion to said at least one fixing portion. The coupling can be configured to enable the at least one fixing portion to move relative to the at least one lamp engagement portion. The coupling can limit the movement of the at least one lamp engagement portion relative to the at least one fixing portion. For example, relative movement can be limited to 5 mm, 10 mm or 15 mm. The coupling can comprise at least one resilient member. The coupling can comprise a spring. The spring can be a compression spring. The method can include compressing the at least one spring when the lamp and/or the locating member are positioned in relation to the body structure. The at least one compressed spring biases the associated lamp engagement portion against the associated lamp.

According to a further aspect of the present invention there is provided a method of mounting a bumper to the body structure of a motor vehicle using a locating member, the locating member having at least one lamp engagement portion, bumper alignment means and at least one fixing portion for movably mounting the locating member to the body structure; wherein the method comprises:

movably mounting the at least one fixing portion to the body structure, positioning the lamp relative to the body structure, positioning the locating member such that the at least one lamp engagement portion engages the lamp and then fixedly mounting the locating member to the body structure, positioning the bumper in an aligned position in relation to the lamp by means of the bumper alignment means, and fixedly mounting the bumper in said aligned position. In this arrangement, the at least one fixing portion can be rigidly connected to the at least one lamp engagement portion. The movable mounting of the at least one fixing portion can enable the position of the at least one lamp engagement portion to be adjusted in relation to the lamp.

The fixing portion can be mounted to the body structure before the lamp is positioned relative to the body structure. The fixing portion can be mounted to the body structure such that said at least one lamp engagement portion initially extends beyond an expected engagement position with the associated lamp. The subsequent positioning of the lamp can cause said at least one lamp engagement portion to engage the lamp.

The fixing portion can be mounted to the body structure after the lamp is positioned relative to the body structure. The fixing portion can be mounted to the body structure such that said at least one lamp engagement portion engages the lamp.

The bumper can have a respective surface complementary to an associated facing surface of each said lamp. When the bumper is in said aligned position, a substantially uniform gap can be formed between said complementary surfaces of the bumper and the lamp.

The bumper alignment means can comprise at least one platform for supporting the bumper. The or each platform can be positioned a predetermined distance from the respective lamp engagement portion. The predetermined distance can define said substantially uniform gap between the complementary surfaces of the bumper and the lamp.

The or each lamp and the body structure can comprise complementary facing surfaces. A substantially uniform gap can be formed between the or each pair of complementary facing surfaces. Alternatively, the lamp can abut the body structure. The body structure can comprise a body panel alongside which the lamp is mounted.

The bumper can be fixedly mounted to the locating member and/or the body structure.

According to a further aspect of the present invention there is provided an apparatus for mounting a bumper to the body structure of a motor vehicle, the apparatus comprising a locating member having at least one lamp engagement portion for engaging a lamp, bumper alignment means and at least one fixing portion for provisionally mounting the locating member to the body structure, wherein a coupling is provided to enable relative movement between said at least one fixing portion and the at least one lamp engagement portion, the bumper alignment means being configured to align the bumper in relation to the body structure and/or the lamp.

The coupling can comprise a spring. The spring can be a compression spring.

According to a further aspect of the present invention there is provided apparatus for mounting a bumper to the body structure of a motor vehicle, the apparatus comprising a locating member having at least one lamp engagement portion for engaging a lamp, bumper alignment means and at least one fixing portion for provisionally mounting the locating member to the body structure, wherein said at least one fixing portion is configured to movably mount the locating member to the body structure, the bumper alignment means being configured to align the bumper in relation to the body structure and/or the lamp.

The or each fixing portion can comprise an elongated slot for movably mounting the locating member to the body structure.

The locating member can comprise a first lamp engagement portion for engaging a first lamp and a second lamp engagement portion for engaging a second lamp. The locating member can be configured to extend transversely across the vehicle.

The locating member can comprise means for fixedly mounting the locating member to the body structure. The mounting means can comprise one or more mechanical fasteners. The mechanical fasteners can be disposed in one or more apertures formed in the locating member.

The bumper alignment means can comprise at least one platform for supporting part of the bumper. The or each platform can be positioned a predetermined distance from the respective lamp engagement portion.

The locating member can be adapted to extend substantially across the rear of the body structure of the motor vehicle. A bumper alignment means can be provided at each end of the locating member. An lamp engagement portion can be provided at each end of the locating member.

According to a further aspect of the present invention there is provided a motor vehicle body structure comprising a locating member as described herein.

According to a still further aspect of the present invention there is provided a motor vehicle comprising a motor vehicle body structure in combination with a locating member as described herein. The motor vehicle can comprise a respective lamp associated with the or each locating member, and a bumper. The bumper can have a respective surface complementary to an associated facing surface of the or each lamp. A substantially uniform gap can be formed between the complementary surfaces of the bumper and the or each lamp.

Within the scope of this application it is expressly intended that the various aspects, embodiments, examples and alternatives set out in the preceding paragraphs, in the claims and/or in the following description and drawings, and in particular the individual features thereof, can be taken independently or in any combination. Features described in connection with one embodiment are applicable to all embodiments, unless such features are incompatible.

BRIEF DESCRIPTION OF THE DRAWINGS

One or more embodiments of the present invention will now be described, by way of example only, with reference to the accompanying drawings, in which.

DETAILED DESCRIPTION OF AN EMBODIMENT

Figure 1:
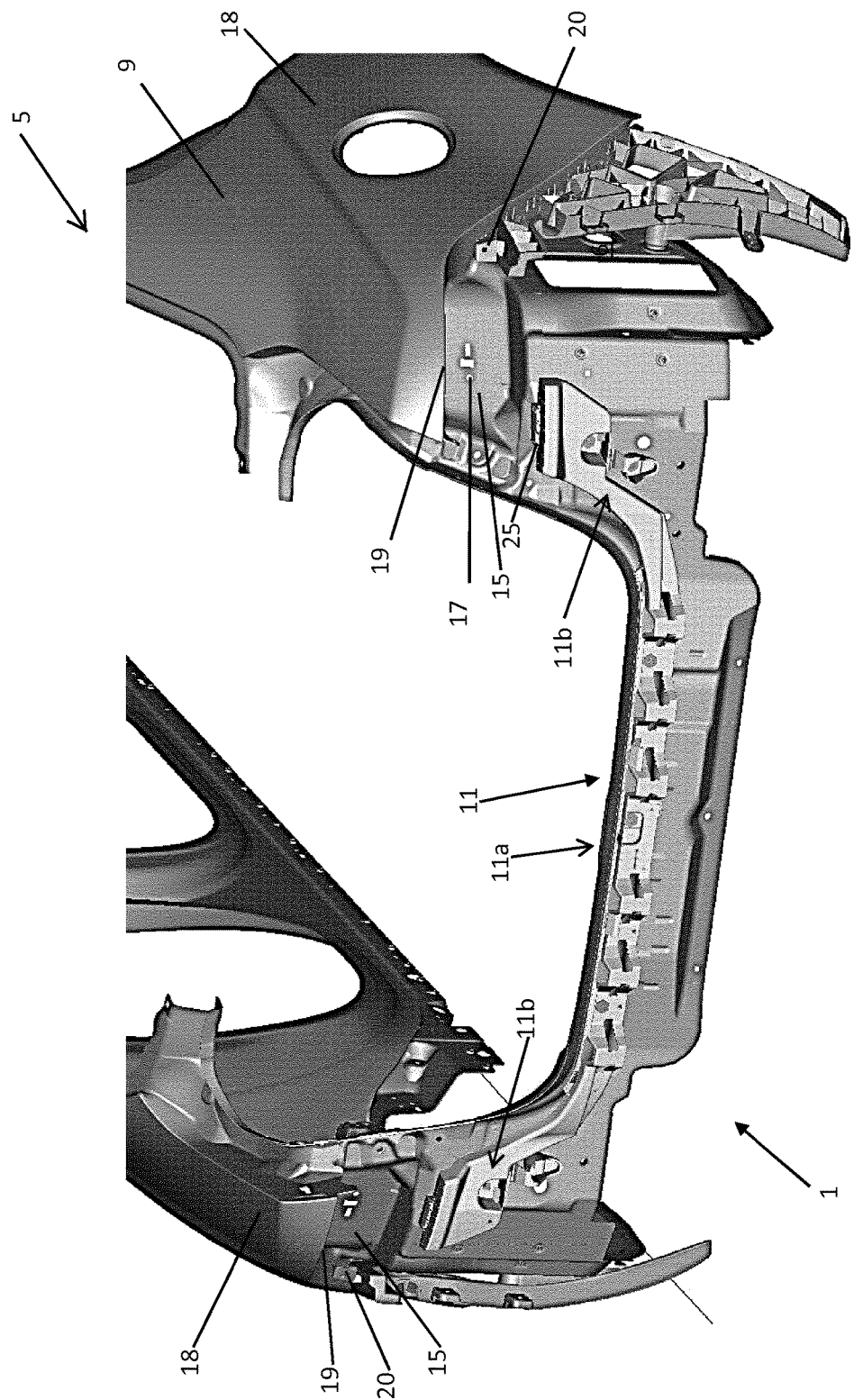
FIG. 1 is a perspective view of the rear of a motor vehicle and shows a mounting bracket for mounting a rear bumper.

A bumper mounting apparatus 1 and a related method for mounting a bumper 3 to a motor vehicle 5 in accordance with an embodiment of the present invention will now be described with reference to FIGS. 1 to 9. A rear perspective view of the rear of the motor vehicle 5 is shown in FIG. 1 prior to mounting the bumper 3 and a pair of tail lamps to a body structure (shell) 9 of the motor vehicle 5.

The bumper mounting apparatus 1 comprises a locating member for provisionally locating the bumper 3 in relation to the body structure 9. In the present embodiment the bumper locating member is in the form of a locating bracket 11. The bracket 11 comprises a main transverse portion 11a extending across the major part of the rear of the motor vehicle 5, and left and right lateral portions 11b which extend upwardly on each side of the transverse portion 11a in the present embodiment. The bracket 11 is a one-piece injection molding made of polypropylene. The transverse portion 11a is provided with a series of apertures 13 for use in fixedly mounting the bracket 11 to the body structure 9. Three of these apertures 13 are provided in the transverse portion ha of the bracket 11, and a respective aperture 13 is formed in each of the lateral portions 11b. The aperture 13 in the centre of the transverse portion ha can be used to locate the bracket 11 in a Y-axis corresponding to a vertical axis of the motor vehicle 5.

Figure 2:
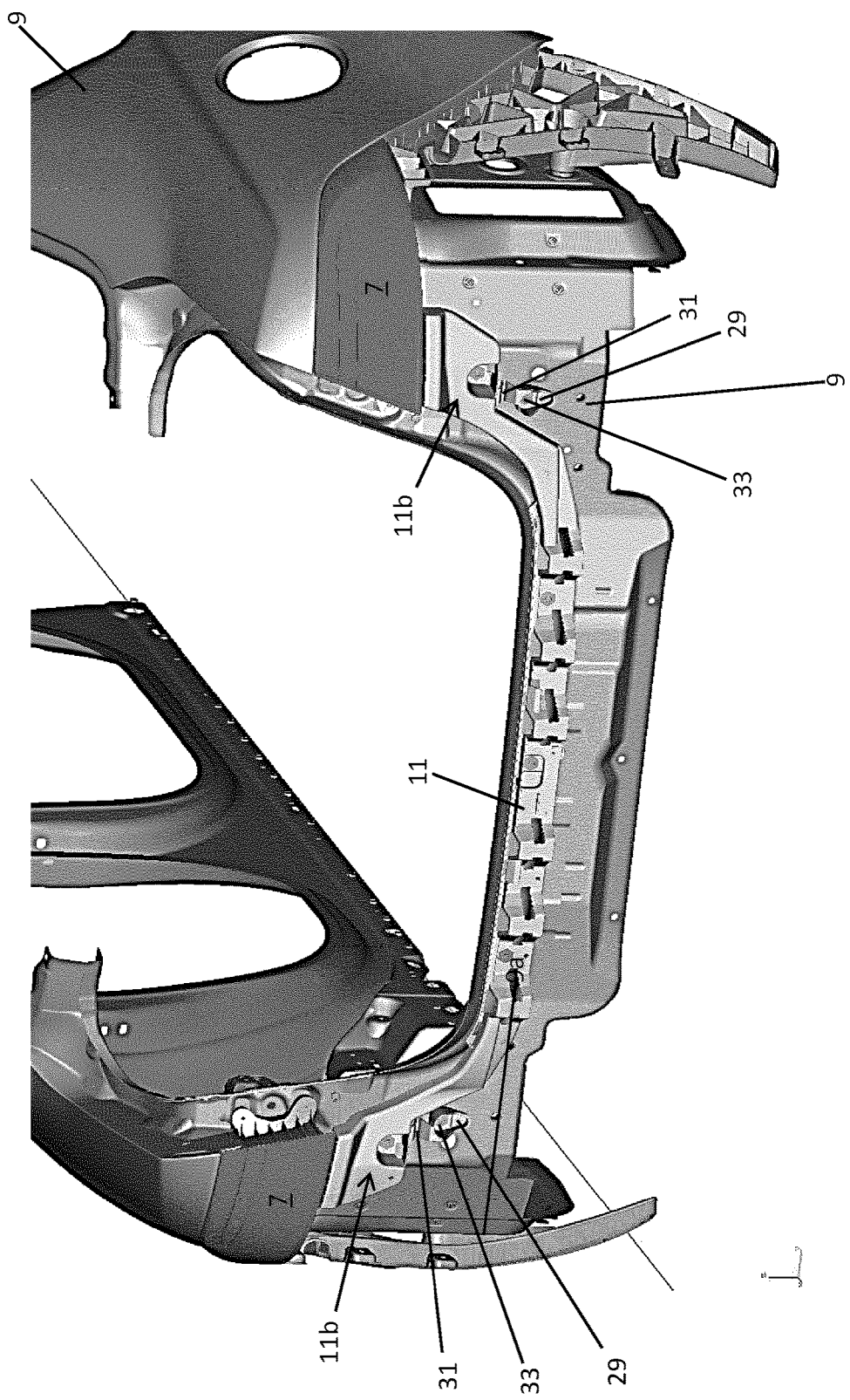
FIG. 2 is a perspective view similar to that of FIG. 1, and shows the tail lamps mounted to the body structure of the motor vehicle.

As shown in FIG. 1, the body structure 9 is provided with a pair of lamp-receiving portions 15. Each of the lamp-receiving portions 15 is shaped to complement the shape of the associated lamp 7, and is provided with an aperture 17 for receiving a mounting pin (not shown) extending from the inner surface of that lamp 7. The lamps 7 locate in said lamp-receiving portions 15 to facilitate mounting to the body structure 9, as shown in FIG. 2. The body structure 9 comprises left and right rear quarter panels 18 each defining an edge 19 against which the lamp 7 abuts. A locating member 20 is mounted to the body structure 9 for locating a front portion of the lamp 7.

Figure 3:
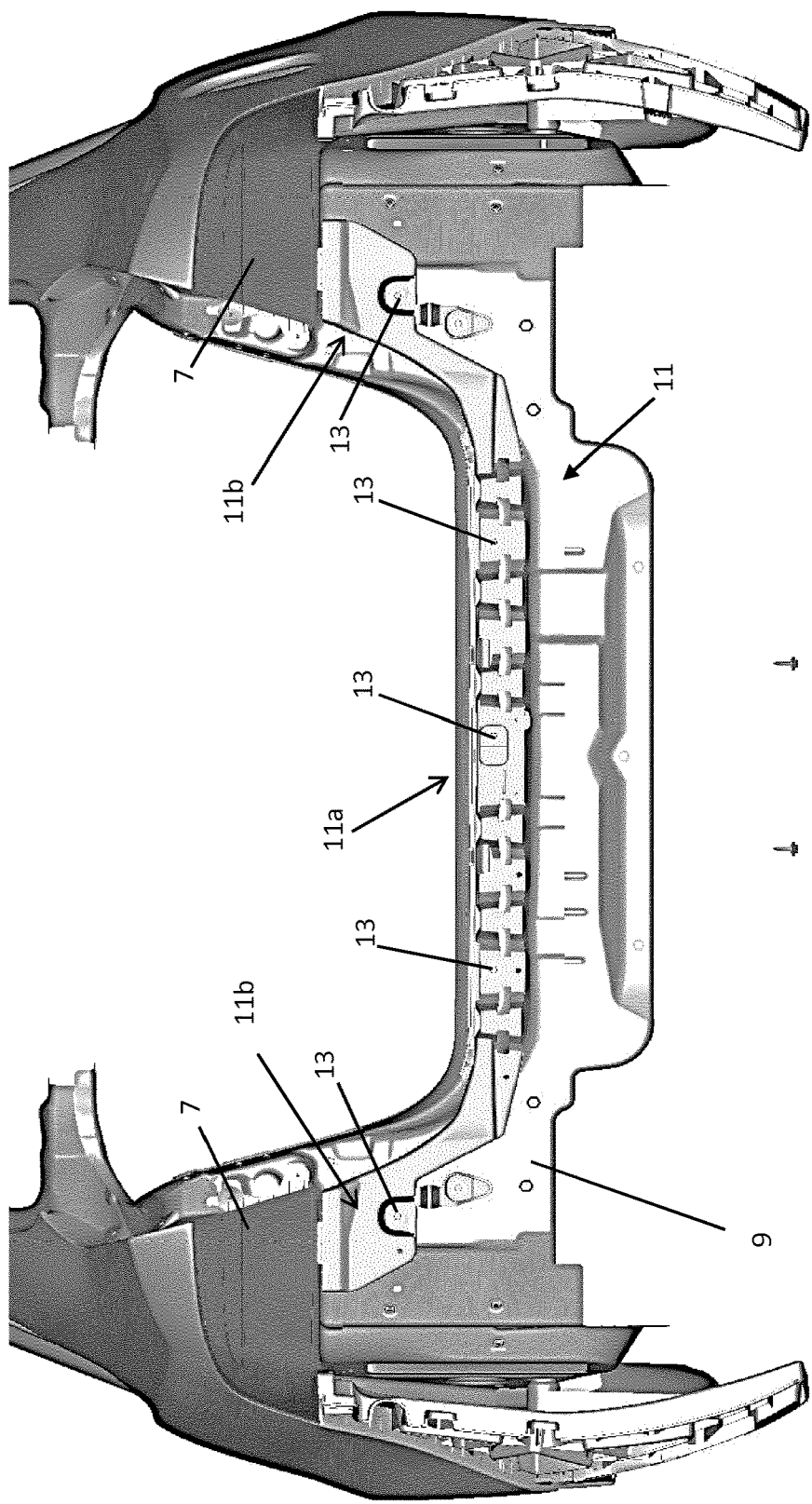
FIG. 3 is end elevation of the arrangement shown in FIG. 2 with the tail lamps mounted to the body structure.
Figure 4:
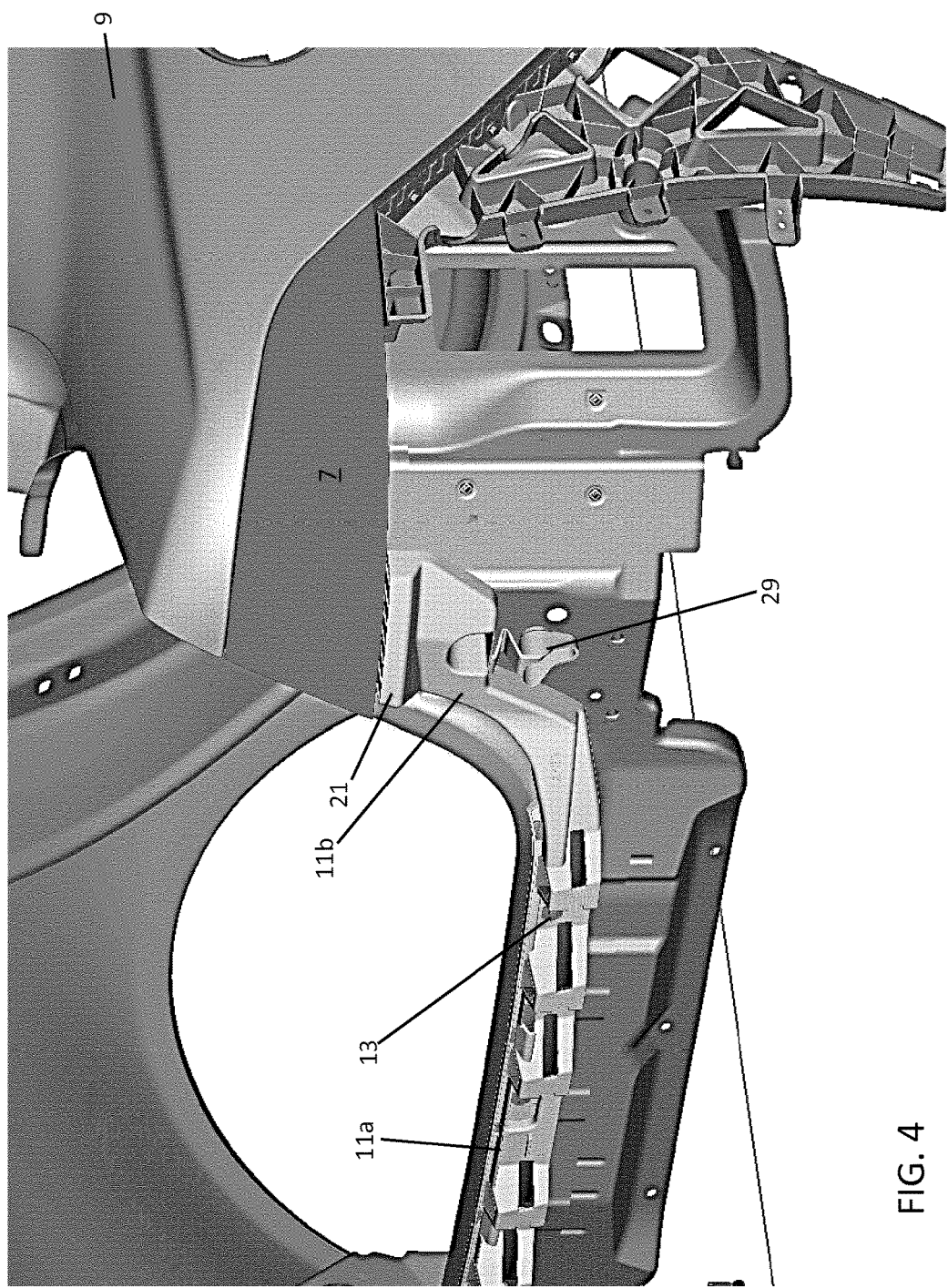
FIG. 4 is a perspective view of the right hand rear corner of the motor vehicle showing the offset between the tail lamp and the mounting bracket.
Figure 5:
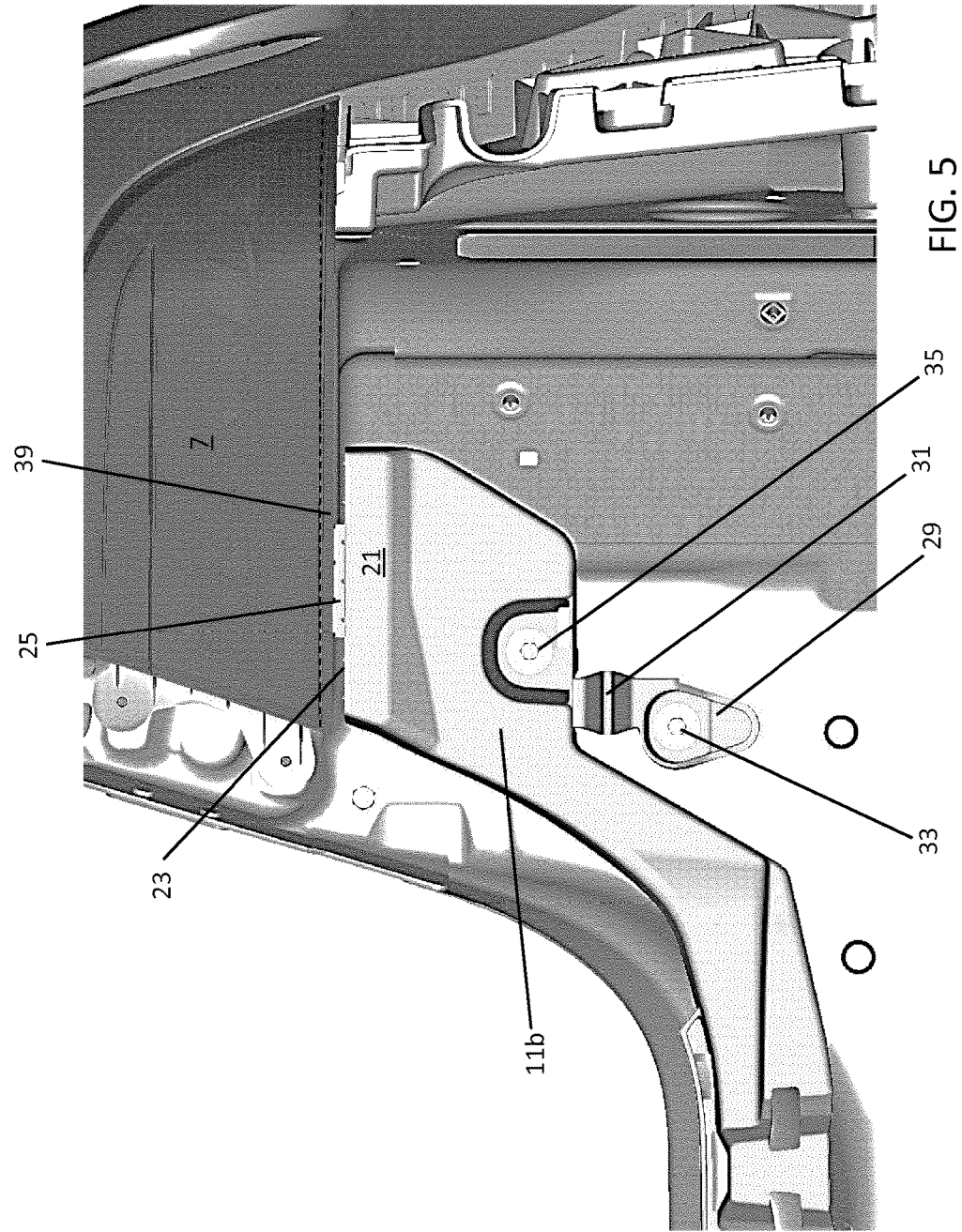
FIG. 5 is an end elevation of the arrangement shown in FIG. 4 with the right tail lamp mounted to the body structure.
Figure 6:
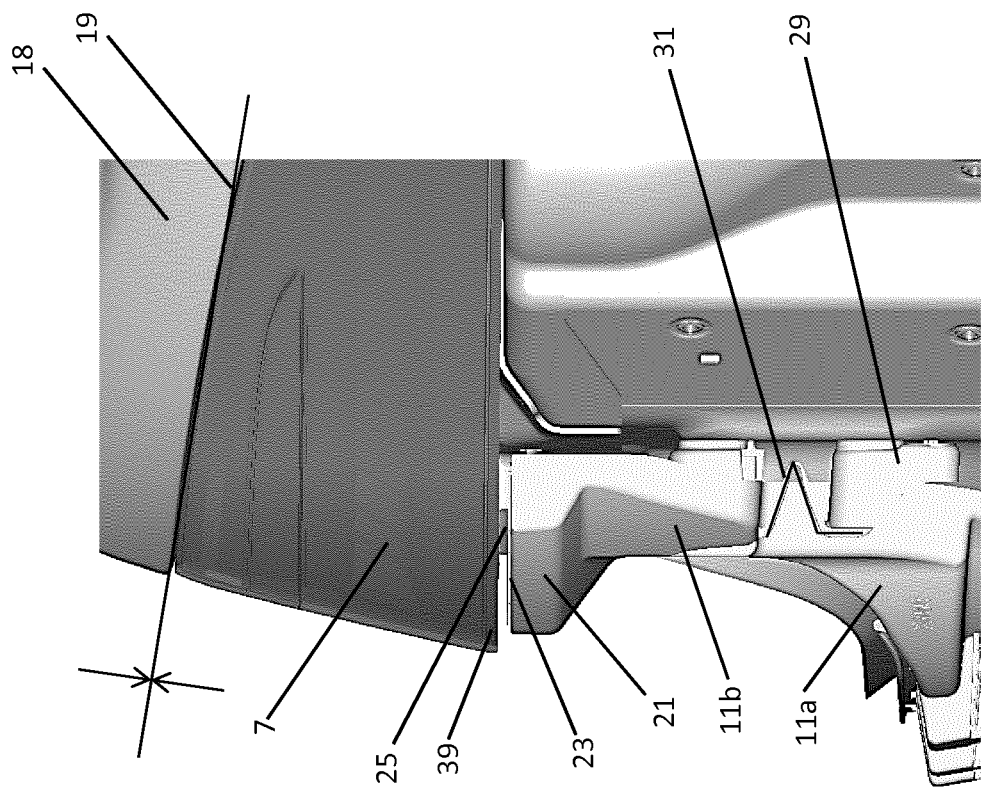
FIG. 6 is a side elevation of the arrangement shown in FIG. 5.
Figure 7:
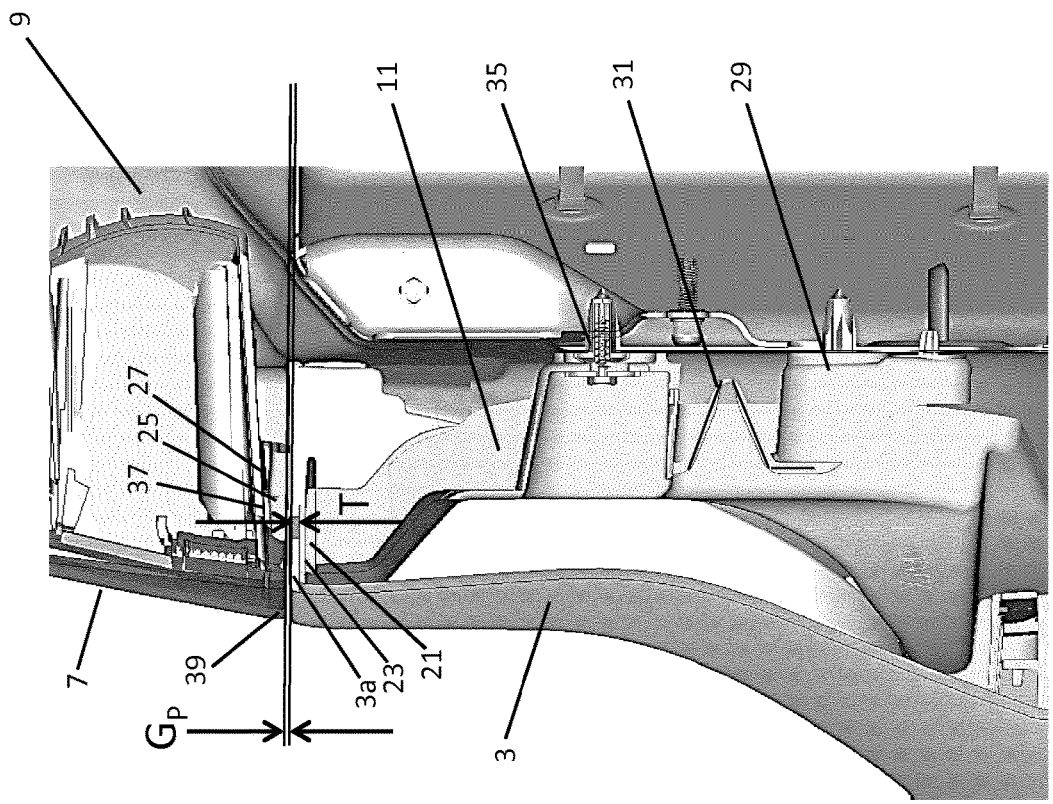
FIG. 7 is a sectional view of the arrangement shown in FIG. 6 with the bumper mounted to the mounting bracket.
Figure 8:
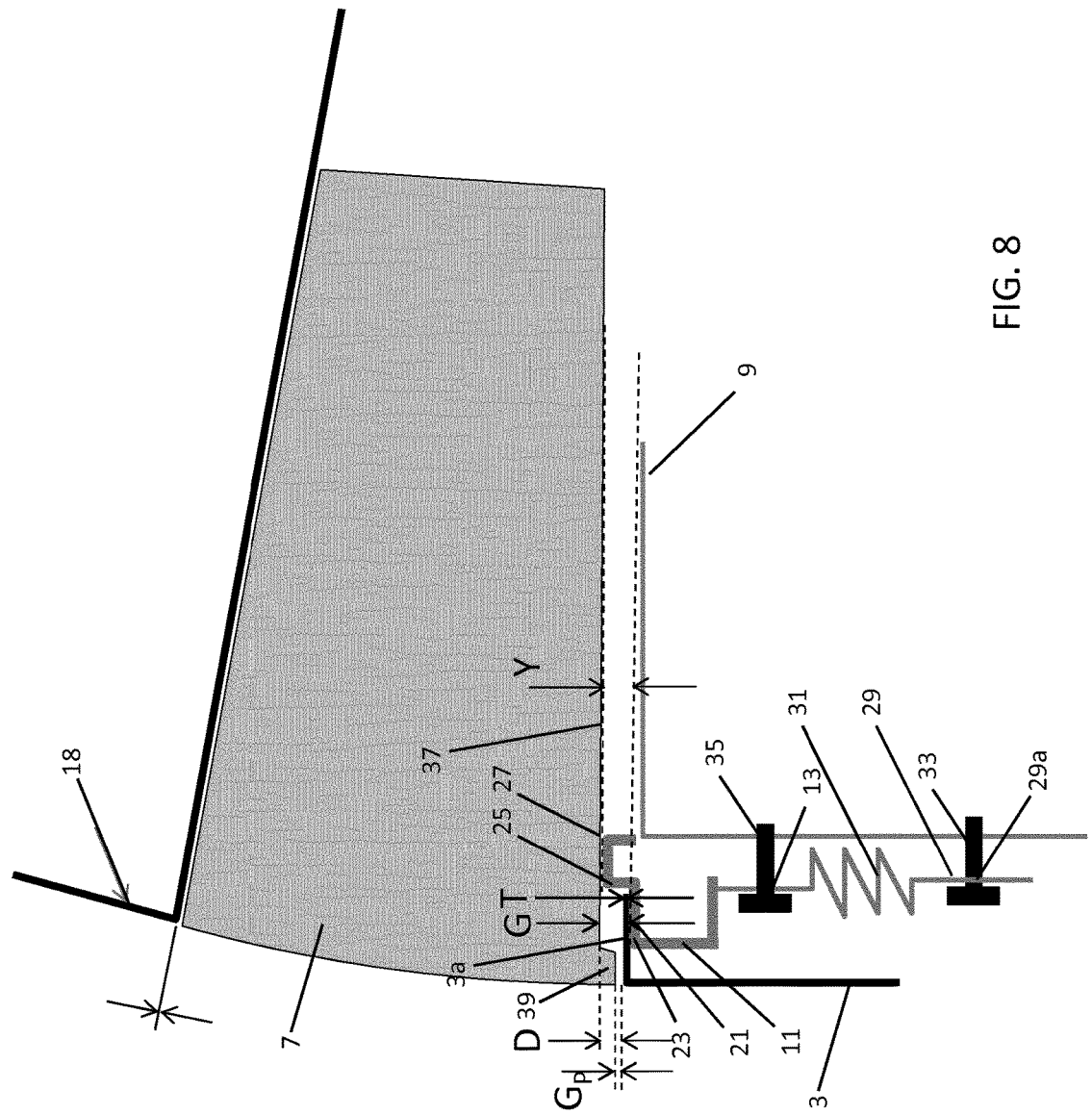
FIG. 8 is a schematic representation of the arrangement shown in FIG. 7.

As shown in FIGS. 3, 4 and 5, the lateral portions 11b of the bracket 11 each comprise means for aligning the bumper 3. In the present embodiment the bumper alignment means or portion is in the form of left and right platforms 21 defined in said lateral portions 11b of the mounting bracket 11. The platforms 21 each define a support surface 23 for supporting an upper sidewall 3a of the bumper 3 in an aligned position with reference to the lamp 7. A side elevation of the lamp 7 and the bracket 11 is shown in FIG. 6 before the bumper 3 is installed. At least one lamp-engaging projection 25 extends upwardly from an inner edge of the support surface to contact an underside of the associated lamp 7. In particular, an upper surface 27 of each lamp-engaging projection 25 is configured to establish a localized contact with the associated lamp 7. The lamp-engaging projection 25 can, for example, take the form of a prong arranged to form a point contact. A sectional view of the assembly comprising the bumper 3, lamp 7 and the bracket 11 is shown in FIG. 7 and illustrated schematically in FIG. 8. As shown in FIG. 8, an offset Y is defined between the support surface 23 of the platform 21 and the upper surface 27 of the lamp-engaging projection 25. The offset Y has a dimension greater than the thickness T of the upper sidewall 3a of the bumper 3 to define a panel gap G between the bumper 3 and the lamp 7. The panel gap G is the gap which is visible between the bumper 3 and the lamp 7 when they have been installed in their final position.

An interim (or provisional) mounting means or fixing portion is provided for movably mounting the bracket 11 to the body structure 9, as shown in FIG. 5. The mounting means in the present embodiment is in the form of a plate 29 associated with each lateral portion 11b of the bracket 11. A coupling in the form of a spring 31 is provided to couple each plate 29 to the respective lateral portion 11b. The spring 31 permits relative movement between the plate 29 and the remainder of the bracket 11, thereby allowing the position of the associated platform 21 to be adjusted relative to the body structure 9. In the present embodiment, when the plate 29 is mounted to the body structure 9, the spring 31 biases the remainder of the bracket 11 upwardly. The plates 29 and the springs 31 are integrally molded with the remainder of the bracket 11. In a variant, the plates 29 and the springs 31 could be separate components which are mounted to the bracket 11. The mounting of the bumper 3 and the lamps 7 to the body structure 9 will now be described in more detail.

The first step is fixedly to mount the plates 29 to the body structure 9 using first mechanical fasteners 33 which pass through respective mounting apertures 29a formed in the plates 29 and into complementary apertures (not shown) in the body structure 9, as shown in FIG. 2. The first mechanical fasteners 33 inhibit relative movement between the plate 29 and the body structure 9. However, the remainder of the bracket 11, comprising the transverse portion 11a and the lateral portions 11b, remain movable relative to the body structure 9 by virtue of the springs 31. Thus, the plates 29 function as an interim fixing means suitable for movably mounting the bracket 11 to the body structure 9. The position of the lateral portions 11b in relation to the body structure 9 can be adjusted while the plates 29 are mounted to the body structure 9. The springs 31 bias the transverse portion 11a and the lateral portions 11b upwardly above an expected final mounting position (typically by a distance of about 5 mm).

The next step is to position and fix the lamps 7 to the body structure 9. As the method is the same for both lamps 7, this step will be described for only the lamp 7 on the right-hand side (as seen from the rear) of the motor vehicle 5, as shown in FIGS. 3 and 4. As outlined above, the spring 31 biases the lateral portion 11b above the expected final mounting position. Thus, as the lamp 7 is positioned within the lamp-receiving portion 15, it presses down against the lamp-engaging projection 25 of the lateral portion 11b, thereby compressing the spring 31 and displacing the lateral portion 11b and the transverse portion 11a downwardly. The now compressed spring 31 biases the lamp 7 upwardly towards the edge 19 of the rear quarter panel 18 to facilitate alignment of the lamp 7 with respect to the body structure 9. The mounting pin of the lamp 7 locates in the associated aperture 17 in the lamp-receiving portion 15. The locating member 20 associated with that lamp-receiving portion 15 is received in a recess (not shown) formed in the associated lamp 7 to facilitate aligning the lamp 7 with the edge 19. The lamp 7 is then fixedly mounted to the body structure 9 by means of spring fasteners (not shown) passing through apertures in the lamp and complementary aligned apertures in the body structure 9. The lamp 7 is shown mounted to the body structure in FIGS. 3 and 4.

Once the lamp 7 is fixed in position, the spring 31 continues to press the lamp-engaging projection 25 of the bracket 11 against an underside 37 of the lamp 7. Thus, the spring 31 biases the bracket 11 towards a final mounting position relative to the lamp 7. As shown in FIG. 5, the next step is fixedly to mount the bracket 11 to the body structure 9 in this final mounting position. In the present embodiment, second mechanical fasteners 35 are inserted through the apertures 13 and into complementary apertures (not shown) in the body structure 9 to mount the bracket 11 in the final mounting position. The transverse portion 11a and the lateral portions 11b are thereby fixedly mounted to the body structure 9.

The final step is to position and fix the bumper 3 to the bracket 11. As shown in the sectional view shown in FIG. 7 and schematically in FIG. 8, the upper sidewall 3a of the bumper 3 locates on the support surface 23 of the platform 21. With the bracket 11 fixedly mounted in the aforementioned final mounting position, the support surface 23 can be used to position the bumper 3 in an aligned position in which the upper sidewall 3a is aligned with the lamp 7 to form said substantially uniform panel gap G. As outlined above, the offset Y defined between the support surface 23 of the platform 21 and the upper surface 27 is greater than the thickness T of the upper sidewall 3a of the bumper 3 so that a gap G exists between the bumper 3 and the underside 37 of the lamp 7.

As shown in the schematic illustration of FIG. 8, an outer face of the lamp 7 forms a lip 39 which projects downwardly towards the upper surface of the bumper 3. The lip 39 projects a depth D below the underside 37 of the lamp 7. The depth D is less than the gap G between the bumper 3 and the underside 37 of the lamp 7. Thus, it will be appreciated that a visible panel gap $G_P$ is formed between a lower edge of the lip 39 and the bumper 3, in normal use, and is smaller than the gap G between the bumper 3 and the underside 37 of the lamp 7. In an arrangement as in FIG. 8, the required panel gap $G_P$ can be predefined by ensuring that the offset Y is the sum of the thickness T, the depth D and the desired panel gap $G_p$. By disposing the lamp-engaging projection 25 inwardly of the lip 37, the lamp-engaging projection 25 can at least partially be hidden from view when the bumper 3 is installed.

In certain embodiments, the lip 37 could be omitted from the lamp 7. The skilled person would appreciate that in such an arrangement the gap G between the bumper 3 and the underside 37 of the lamp 7 will be the visible panel gap $G_p$. In an arrangement as in FIG. 8 (but with the lip 39 omitted), the offset Y will be equal to the sum of the thickness T of the upper sidewall 3a and a predefined distance (for example 2 mm or 3 mm) which will form the panel gap $G_p$.

The skilled man will appreciate that FIG. 8 shows the upper surface 27 to be parallel to the support surface 23, such that the offset Y is uniform. In reality, the surfaces 27 and 23 may be not parallel, as illustrated in FIG. 7 in which the underside of upper surface 27 (and the underside 37 of the lamp 7) slopes upwardly, away from the panel gap $G_P$, and thus the offset Y increases away from the panel gap $G_p$. The skilled person would be able to take this into account when determining the relative positioning of the upper surface 27 and the support surface 23, to achieve a predefined panel gap $G_p$.

Figure 9:
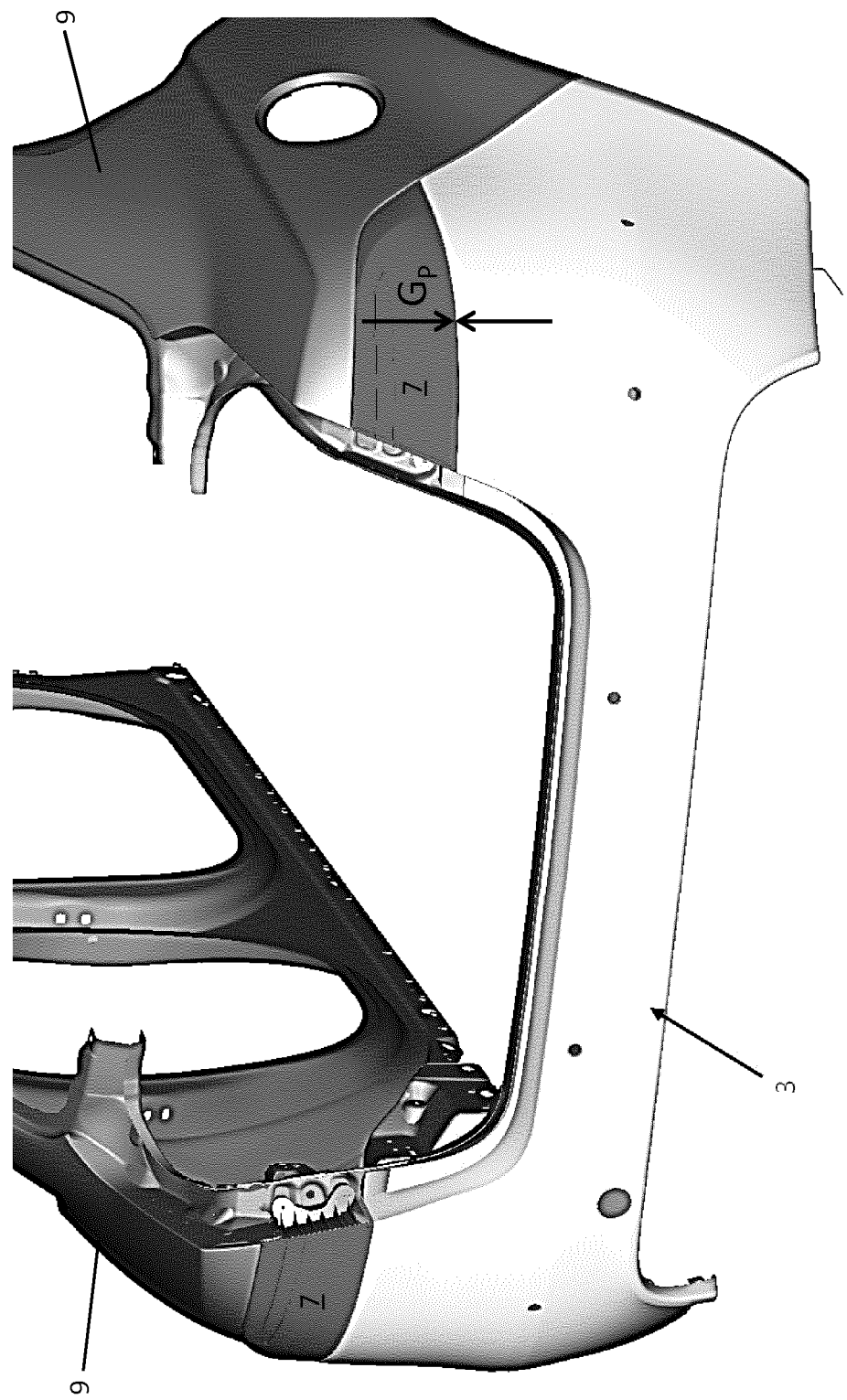
FIG. 9 is a rear perspective view showing the bumper mounted to the body structure.

Once the upper sidewall 3a of the bumper 3 is positioned on the support surface 23 of the platform 21, the bumper 3 is located in the aligned position in which a substantially uniform panel gap $G_P$ is formed between the lamp 7 and the bumper 3. It will be appreciated that, by defining the offset Y, whether there is a lip 39 or not, the panel gap $G_P$ can be set to a desired distance The bumper 3 is then fixedly mounted to the bracket 11 by spring fasteners (not shown) mounted to the bumper 3 which locate in complementary apertures (not shown) in the bracket 11. The resulting assembly is shown in FIG. 9.

It will be apparent that modifications could be made to the embodiment described above. For example, the bracket 11 and associated lamp-engaging projection 25 (apart from the springs 31) could be made from a suitable metal such as mild steel or aluminum.

A further modification would be to mount the bracket 11 to the body structure 9 without incorporating the springs 31. The plates 29 can each be formed with an elongated mounting aperture (such as a vertical slot), through which a fastener is passed to fix the bracket 11 to the body structure 9. The elongated aperture can permit limited relative movement between the bracket 11 and the body structure 9. The plates 29 can be movably mounted to the body structure 9 such that the position of the lateral portions 11b can be adjusted relative to the body structure 9 by virtue of the elongated mounting apertures. A fitter on the production line would then fit the lamps 7 and lift the bracket 11 such that the lamp-engaging projection 25 contacts an underside of each lamp 7. While the lamp-engaging projection 25 is held in contact with an underside of the lamps 7, the bracket 11 can be fixedly mounted to the body structure 9 using mechanical fasteners. Again, the final position of the bracket 11 is determined with reference to the lamps 7. The support surface 23 is then used to position the bumper 3 in its aligned position with respect to the lamp 7. The bumper 3 can then be mounted to the bracket 11 in the same way as described herein. The resulting panel gap G between the bumper 3 and the lamp 7 is substantially uniform along its length edges and has a dimension determined by the offset Y between the upper surface 27 of the lamp-engaging projection 25 and the support surface 23 of the platform 21.

Figure 10:
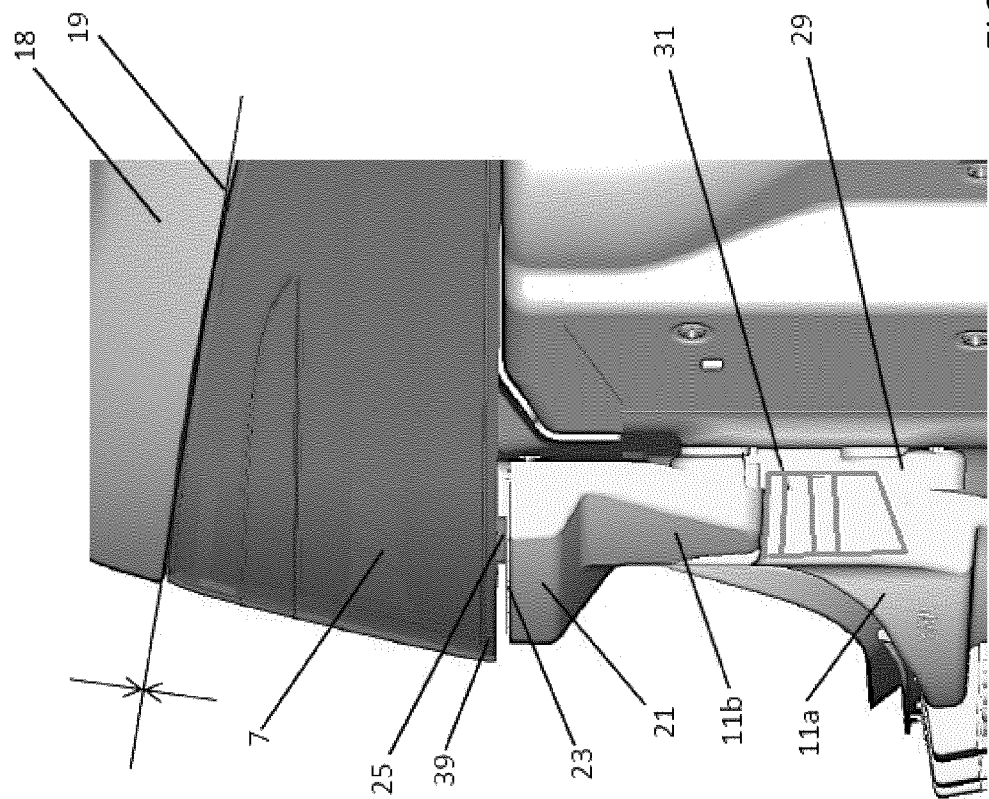
FIG. 10 is an alternative side elevation to the arrangement shown in FIG. 6.

In some embodiments each of the springs 31 may be oriented at a different angle with respect to its longitudinal axis, relative to the orientation shown in FIG. 6. The angle may be a right angle as shown in FIG. 10. The springs 31 may alternatively or additionally include one or more stiffeners. The stiffeners and/or spring orientation may increase the stiffness of the spring with respect to tilting of the bumper mounting apparatus 1 away from the body structure 9. The tilting may be induced by gravity.

The invention claimed is:

1. Apparatus for mounting a bumper to a body structure of a motor vehicle, the apparatus comprising a locating member having a first lamp engagement portion for engaging a first lamp and a second lamp engagement portion for engaging a second lamp, bumper alignment means and at least one fixing portion for provisionally mounting the locating member to the body structure, wherein a coupling is provided to enable relative movement between said at least one fixing portion and the at least one lamp engagement portion, the bumper alignment means being configured to align the bumper in relation to the body structure and/or the lamp.

2. Apparatus as claimed in claim 1, wherein the apparatus comprises at least one further fixing portion on the locating member for finally mounting the apparatus to the body structure.

3. Apparatus as claimed in claim 2, wherein the at least one further fixing portion is separated from the at least one fixing portion by at least the coupling.

4. Apparatus as claimed in claim 1, wherein the coupling comprises a compression spring.

5. Apparatus as claimed in claim 1, wherein the locating member further comprises means for fixedly mounting the locating member to the body structure.

6. Apparatus as claimed in claim 1, wherein the bumper alignment means comprises a platform for supporting part of the bumper, the or each platform being positioned a predetermined distance from the respective lamp engagement portion.

7. Apparatus as claimed in claim 1, wherein the locating member is adapted to extend substantially across the rear of the body structure of the motor vehicle, a respective lamp engagement portion being provided at each end of the locating member.

8. A motor vehicle body structure comprising the apparatus as claimed in claim 1.

9. A motor vehicle comprising the motor vehicle body structure as claimed in claim 8.

10. A motor vehicle as claimed in claim 9 comprising a respective lamp associated with the or each locating member, and a bumper, wherein the bumper has a respective surface complementary to an associated facing surface of the or each lamp, a substantially uniform gap being formed between the complementary surfaces of the bumper and the or each lamp.

* * * * *